J. E. DEMPSEY.
CONTROL MECHANISM FOR HEADLIGHTS.
APPLICATION FILED FEB. 17, 1917.

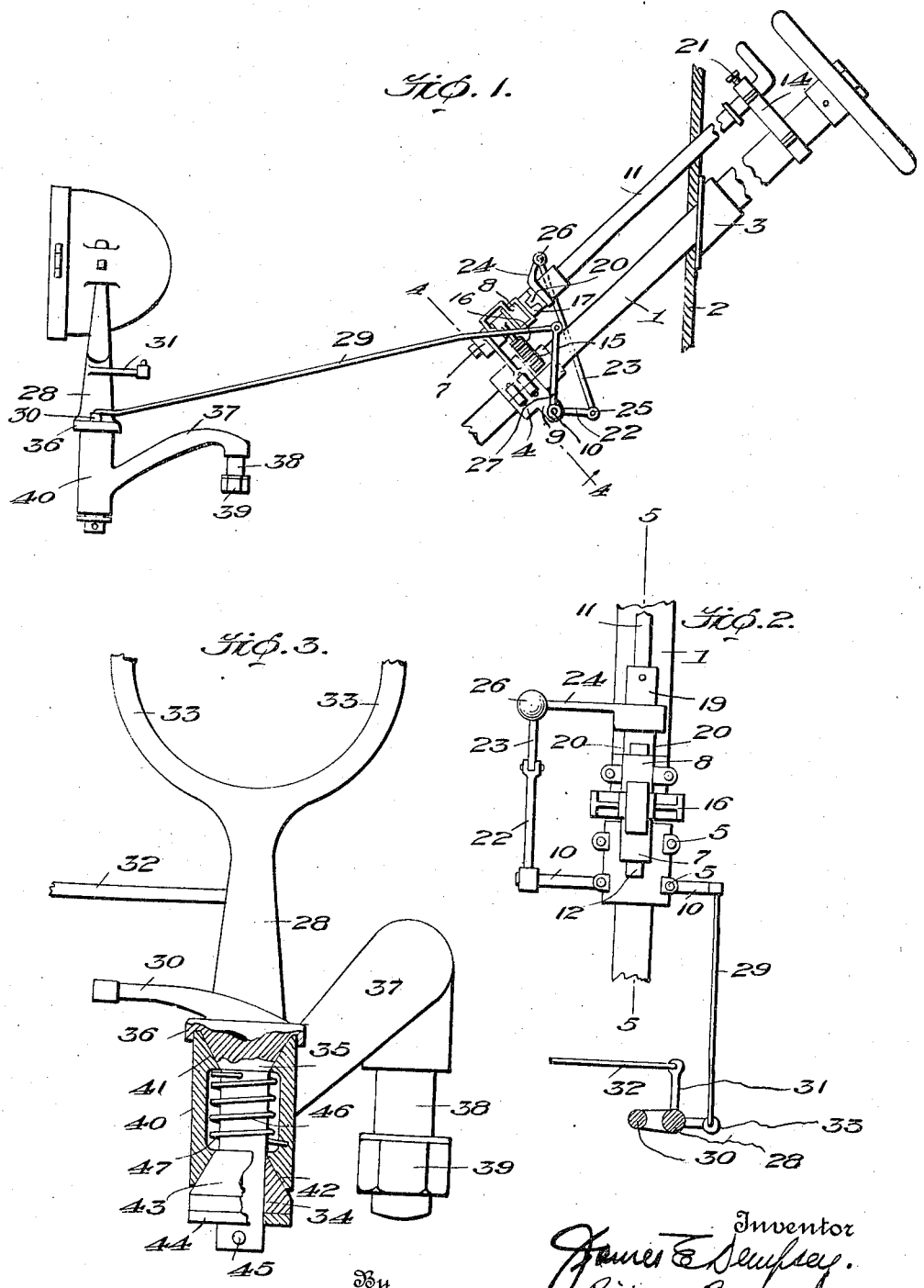

1,310,691.

Patented July 22, 1919.
2 SHEETS—SHEET 2.

Inventor
James E. Dempsey.
Attorneys

UNITED STATES PATENT OFFICE.

JAMES E. DEMPSEY, OF MANITOWOC, WISCONSIN.

CONTROL MECHANISM FOR HEADLIGHTS.

1,310,691.   Specification of Letters Patent.   Patented July 22, 1919.

Application filed February 17, 1917. Serial No. 149,303.

*To all whom it may concern:*

Be it known that I, JAMES E. DEMPSEY, a citizen of the United States, residing at Manitowoc, in the county of Manitowoc, State of Wisconsin, have invented certain new and useful Improvements in Control Mechanism for Headlights; and I do hereby declare the following to be a full, clear, and exact description of the invention, such as will enable others skilled in the art to which it appertains to make and use the same.

This invention is a control mechanism for use in connection with the headlights of an automobile.

It has for its object to provide a simple and inexpensive device adapted to be applied to an automobile, whereby the headlights of the vehicle so equipped are at all times under the control of the operator.

It has for a further object to provide means readily applicable to an automobile whereby the headlights of a vehicle so equipped may be directed always in the direction of travel of the vehicle, or may be retained in a predtermined position, or may be oscillated from side to side without regard for the direction of travel of the vehicle.

With these and other objects in view that may more fully hereinafter appear, the invention comprises a headlight control element which may be in the form of an auxiliary shaft mounted to coöperate with the steering post of the automobile and a plurality of gear members so positioned with respect to the steering post and the auxiliary shaft that the rotary motion of the former is transmitted to the latter. Suitable means may be then employed to convert the rotary motion of the auxiliary shaft into the oscillatory motion of the headlights, which may be carried by suitable supports, wherein means are provided to urge the headlights always in the predetermined direction.

It is to be understood that the right is reserved to make such changes and alterations in size and proportion of parts and in minor details of construction as fairly fall within the scope of the appended claims, without departing from the spirit or sacrificing any of the advantages of the invention.

In the accompanying drawings:—

Figure 1 is a side elevation of the device applied to an automobile, parts of the automobile being omitted.

Fig. 2 is a fragmental plan view of the device partly in section.

Fig. 3 is a front elevation of a lamp support, partly in section.

Like reference numerals are used to designate like parts throughout.

Figure 4:
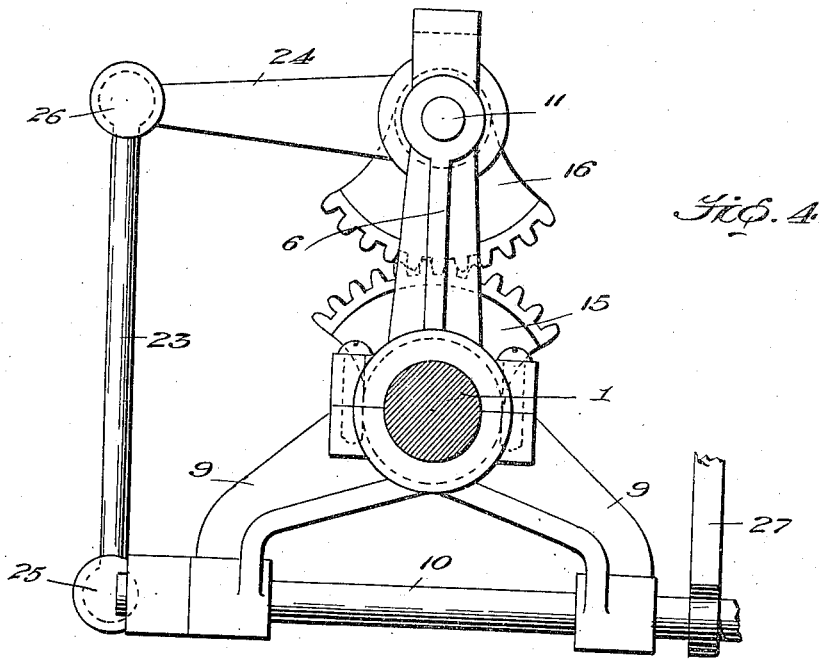
Fig. 4 is a sectional view on the line 4—4 of Fig. 1.

In the embodiment of my invention disclosed in the accompanying drawings, 1 designates a steering post of an automobile, secured into the dashboard 2 by the usual collar or bearing 3. The steering post is shown provided with a bearing 4 mounted preferably adjacent the lower end thereof. The bearing is preferably made in sections so as to facilitate its mounting upon the steering post, and may be provided with any suitable means, such as bolts 5 to retain it in operative position upon the post. One section of the bearing may be provided with a web 6, carrying a plurality of bearings 7 and 8, said bearings being shown concentric to an axis parallel to that of the steering post 1. Another section of the bearing 4 may be provided with a plurality of arms 9, said arms carrying suitable bearings to receive a rock shaft 10, the axis of which is shown lying at a plane perpendicular to that of the steering post.

The headlight control element is shown in the form of an auxiliary shaft 11 and may be mounted parallel to the steering post 1, or may be of any other approved form, and mounted in any other suitable manner to apply the invention to standard equipment of particular types of vehicles. In the drawings, the lower extremity 12 of the shaft 11 is shown journaled in a bearing 7, and its upper extremity 13 supported by a suitable bearing 14 carried by the steering post.

Figure 5:
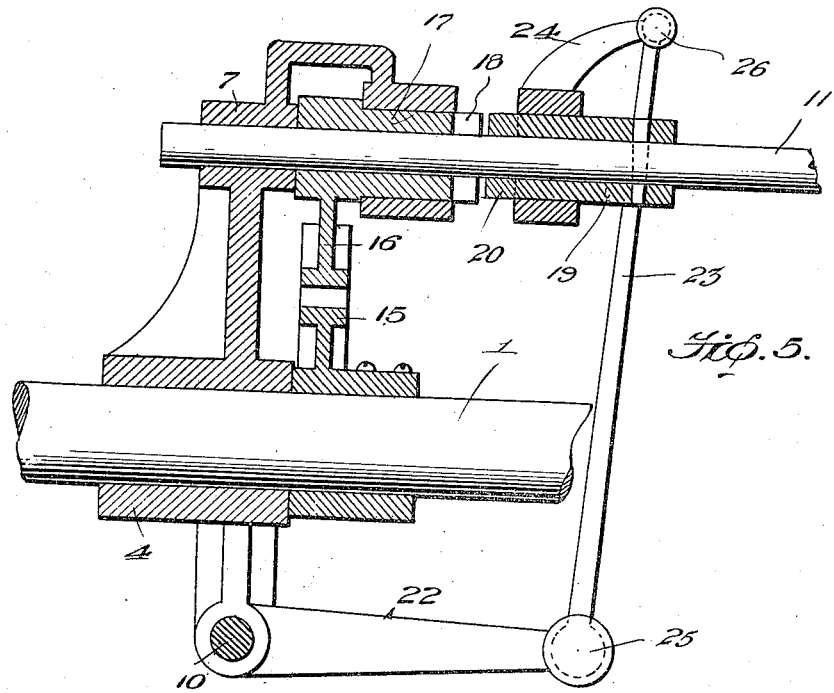
Fig. 5 is a sectional view on the line 5—5 of Fig. 2.

The steering post 1 is shown further provided with a spur gear 15 rigidly secured thereto, said gear having a sectional collar as shown in Fig. 4 to permit of its being readily mounted upon a steering post. To coöperate with the gear member 15 may be provided a similar gear member 16, loosely mounted upon the auxiliary shaft 11, and preferably above and immediately adjacent the bearing 7. The gear 16 may be provided with an extended collar 17 adapted to journal in the bearing 8, said collar being provided at its upper extremity with a plurality of angular slots 18, preferably positioned diametrically opposite each other. To coöperate with the slotted upper end of the extended collar of the gear member 16, a collar 19 may be provided, rigidly secured to the shaft 11, said collar being provided with a plurality of lugs 20 designed to engage the corresponding slots 18 of the extended collar 17 of the gear 16. It is evident from the foregoing description taken in connection with Figs. 1 and 5 of the drawings, that when the lugs 20 of the collar 19 are engaged with the slots 18 of the collar 17, any rotary motion of the steering post 1 will be communicated to the shaft 11, but when the lugs 20 are withdrawn from the engagement with the slots 18 by sliding the shaft 11 through the bearings 7 and 14, no motion of the steering post 1 will be communicated to the shaft 11, the gear 16 in this instance, acting as an idler. A set screw 21 may be provided in the bearing 14 to retain the shaft 11 in operative or in inoperative position relative to the steering post 1.

To convert the rotary motion of the steering post into oscillatory motion of the headlights of the vehicle, any suitable means may be provided, such as a shaft 10 carried by the arms 9 of the bearing 4, as hereinbefore described. The shaft 10 may be provided at one extremity with an arm 22, rigidly mounted on said shaft. The arm 22 may be connected to the shaft 11 by means of a connecting link 23, and an arm 24, said arm being rigidly mounted upon the collar 19. The connections between the arm 22 and the link 23, and the link 23 and the arm 24 are preferably of the ball and socket type, as indicated at 25, 26, respectively. The shaft 10 may be further provided with an upstanding arm 27, rigidly secured thereto, at its other extremity, and preferably in a position substantially at right angles to the arm 22. The arm 27 may be connected to the light support or bracket 28 by means of a suitable link 29 and an arm 30, said arm being carried by the support 28. The connection between the arm 27 and the link 29, is preferably of the ball and socket type, whereas the link 29 may be connected to the arm 30 by any suitable means, such as a pin or bolt. It is evident from the foregoing description that provided the lugs 20 are in engagement with the slots 18, any rotary motion of the steering post 1 will be converted into oscillatory motion of the light support 28, and that when the lugs 20 are withdrawn from engagement with the slots 18, the support 28, by means of manually rotating the shaft 11, may be oscillated independently of the motion of the steering post 1, or may be retained in a predetermined position by means of the set screw 21.

The support 28 is of a form best shown in Fig. 3, being provided with the arms 33 to receive a lamp of usual construction, and terminating in a reduced cylindrical shank 34, the upper portion of said shank forming a conical bearing surface 35, terminating in an enlarged depending circular retaining flange 36. A suitable hanger 37 may be provided to receive the support 28, said hanger being provided with suitable means, such as a threaded end 38 and a nut 39 to secure said hanger to an appropriate part of the vehicle. The other extremity of the hanger terminates in a hollow cylindrical member 40, being provided at its upper and lower extremities with tapered bearing surfaces 41, 42 to engage the conical bearing surface 35 of the shank 34 and the cone 43 mounted on the lower extremity of the shank, and retained thereon by any suitable means such as a washer 44 and a pin 45. A helical spring member 46 may be mounted in an enlarged chamber 47 of the cylindrical member 40, said spring having its opposite ends secured to the shank 43 and the inside wall of the cylindrical chamber 47, respectively. This arrangement is clearly shown in Fig. 3.

It is to be understood that a plurality of hangers and supports arranged as above described, may be employed, and may be provided with arms 31 connected by a suitable link 32, whereby the supports may be oscillated in unison.

Having thus described my invention, what I claim as new is:—

1. In a device of the class described, the combination with a steering post, of a headlight control shaft mounted parallel to the steering post and capable of being shifted longitudinally relative to said post, means to communicate the rotary motion of the steering post to the headlight control shaft, means, including a rock shaft coöperating with the headlight control shaft, to convert the rotary motion of the headlight control shaft into oscillatory motion of the headlight, and means to place the headlight control shaft into and out of operative engagement with the steering post when the headlight control shaft is longitudinally shifted.

2. In a control mechanism for vehicle headlights, the combination with a rotatable steering post, of a headlight control shaft mounted on the steering post, a plurality of gears, one carried by the steering post and the other by the headlight control shaft to communicate a rotary motion of the steering post to the shaft, and a clutch having one member supported by the steering post by means of a bearing member for said control shaft and the other member of the clutch secured to the head-light control shaft, said shaft being mounted for reciprocating and rotary movements in said bearing, whereby the rotary motion of the shaft may be converted into oscillatory motion of the headlights when the clutch members are in coöperative engagement.

3. In a device of the class described, the combination with a rotatable steering post, of a headlight control shaft carried thereby, geared elements carried by the steering post and said control shaft to communicate the rotary motion of the steering post to the shaft, a casting movably mounted on the steering post and serving as a bearing for a transversely positioned rock shaft provided with a lever arm, a plurality of clutch members, one of said clutch members being secured for movement with the headlight control shaft, and provided with an arm, a link to connect the arm of said clutch member with an arm of said transversely positioned shaft, and means to connect said transversely positioned rock shaft with a pivotally mounted headlight, whereby the rotary motion of the steering post is converted into oscillatory motion of the headlight.

4. In a control mechanism for vehicle headlights, a rotatable headlight, a steering post having upper and lower bearing brackets, a headlight control shaft mounted for rotary movement and longitudinal movement in the bearings of said bracket, geared elements interposed between said steering post and said headlight control shaft, a clutch element carried by the lower of said steering post brackets to coöperate with a clutch member secured to the headlight control post, means to connect said clutch member of the control shaft with a rotatable headlight whereby said headlight may be shifted simultaneously with the movement of the steering post when the clutch members are in engagement, and a manually controlled locking device carried by the upper bearing bracket to engage the headlight control shaft and maintain it in a position so that its clutch member is out of engagement with the steering post clutch member, whereby the headlight may be shifted independently of the movement of the steering post.

5. In a control mechanism for vehicle headlights, the combination with a rotatable steering post, of a rotatable headlight control shaft mounted thereon and parallel thereto, a plurality of gears to communicate the rotary motion of the steering post to rotative movement of said shaft, means to convert the rotary motion of the shaft into oscillatory motion of the headlights, and means to manually operate the lights by the rotation of said shaft independently of the rotary motion of the steering post.

6. In a control mechanism for vehicle headlights, the combination with a rotatable steering post, of a headlight control shaft rotatably mounted thereon, and substantially parallel thereto, said steering post being provided with a bearing having a rock shaft mounted therein, clutch members to communicate movement from the steering post to the headlight control shaft, means to connect one of the clutch members with the rock shaft, and means to connect the rock shaft with a rotatable headlight, whereby the rotary movements of the steering post and the headlight control shaft may be converted into oscillatory motion for the headlight.

7. In a control mechanism for vehicle headlights, the combination with rotatably mounted vehicle lights and a rotatable steering post, of a headlight control shaft supported by and capable of rotation independently of the steering post, means to rotate the steering post and headlight control shaft simultaneously, a rock shaft mounted on the steering post and having means to connect the same with the vehicle lights, and means to connect said rock shaft with the headlight control shaft, whereby any rotative movement of the headlight control shaft will be transmitted through the rock shaft into oscillatory motion of the headlights.

8. A lamp bracket for a control mechanism for vehicle headlights comprising a hanger provided with a chambered section having conical bearing surfaces formed integral therewith at each end of the chambered section, a lamp supporting standard having a depending shank, said shank being provided with a peripheral retaining flange to engage the exterior of the chambered section and with a conical bearing surface to coöperate with the upper bearing surface of the hanger, a conical retaining element loosely mounted on the shank to engage the lower bearing surface of the hanger, means to retain said conical retaining element on the shank and a resilient element interposed between the hanger and spindle to maintain the spindle in a predetermined position.

In testimony whereof I affix my signature.

JAMES E. DEMPSEY.

Copies of this patent may be obtained for five cents each, by addressing the "Commissioner of Patents, Washington, D. C."